3,182,116
MID-SPAN SPREADER FOR TRANSMISSION LINES
Davis M. Phillips, South Milwaukee, Wis., assignor to McGraw-Edison Company, Milwaukee, Wis., a corporation of Delaware
Filed Aug. 23, 1963, Ser. No. 304,181
2 Claims. (Cl. 174—40)

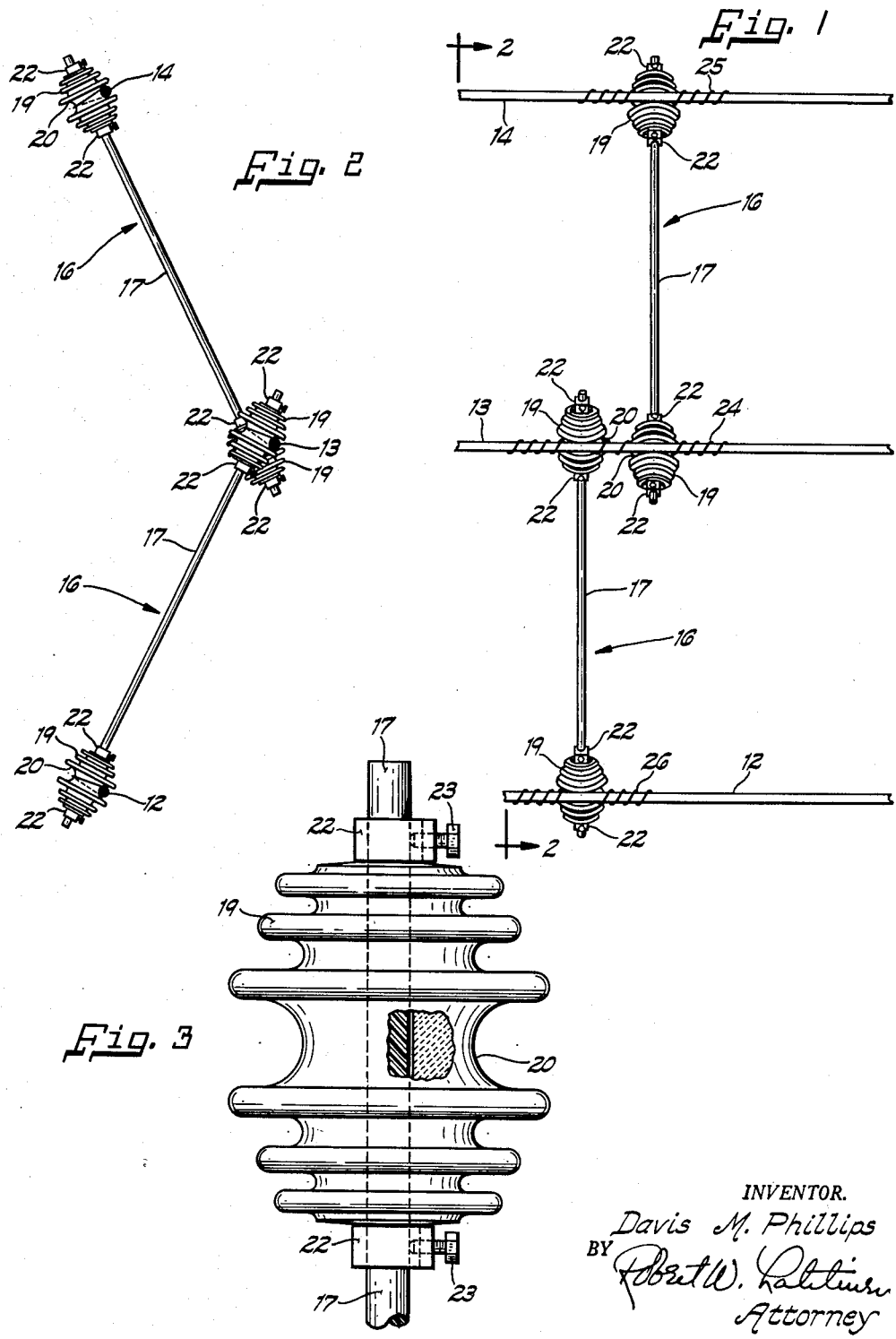

This invention relates to conductor spacers and more particularly to a mid-span spreader for transmission lines.

Transmission lines which either because of excessive sag or conversion to higher voltage have more critical spacing requirements require spreaders to maintain adequate spacing under various weather conditions. When lines are in such a condition it is more difficult to retain an adequate spacing and avoid line to line flashovers when subjected to high winds or certain types of precipitations such as sleet. A spreader for such service must in addition to the ever present demands of economy provide a positive spacing using a material that has rigidity, mechanical strength and toughness, and simultaneously resist the trackage of leakage current to eliminate both electrical losses and deterioration of the structure.

The applicant has provided an economical structure that combines the mechanical strength of a glass fiber reinforced plastic rod and the track resistant qualities of porcelain which additionally effects a damping of transmission line vibration and is adjustable in the field to accommodate variations of conductor spacing.

It is an object of this invention to provide a mid-span spreader having high mechanical strength while retaining adequate electrical characteristics.

It is a further object to provide a mid-span spreader of simple design that is easily adjustable in the field.

It is also an object of this invention to provide a spreader that will also function to dampen vibrations to thereby lessen the likelihood of conductor failure attributable to metal fatigue.

It is an object of this invention to provide a spreader for maintaining transmission conductors at a fixed spacing intermediate supporting structures.

These and other objects and advantages of this invention will become apparent from the following description when taken in connection with the accompanying drawings wherein FIG. 1 shows the mid-span spreader of this invention in assembled condition with three conductors or transmission lines;

FIG. 2 is an elevational view of the spreader taken along line 2—2 of FIG. 1; and FIG. 3 shows a porcelain insulator of the subject spreader in association with a portion of the glass fiber reinforced plastic rod with both members partly in section.

Referring to FIGS. 1 and 2 the mid-span spreader of this invention is shown connected to three conductors 12, 13 and 14. The spreader is formed of two members 16 each having a solid glass fiber reinforced plastic rod 17 and a pair of spool type insulators 19 with each such insulator presenting a side wire opening or annular groove 20. As best seen in FIG. 3 the insulators 19 are mounted about the rod 17 and maintained at a desired axial location by a series of clamps 22 which are secured to the rod at each axial end of each insulator 19. Each of the clamps 22 are secured to the associated rod by a single hexagon head set screw 23 so that the distance between insulators may be varied in the field with minimum difficulty by releasing the single securing element or set screw 23 to relocate the clamp at any selected position along the rod 17 and thereby have an adjustability in the field to accommodate varying line spacings. The center conductor is secured at the side wire grooves 20 of one insulator of each of the adjoining spreader elements 16 by a single continuous plastic tie 24. The upper and lower conductors 14 and 12 are connected respectively by plastic ties 25 and 26 to the associated insulators 19.

In use the porcelain insulators 19 provide the permanent high trackage resistance to leakage currents which is enhanced by the undercut portions that break the water path and provide an extended surface distance. The glass fiber reinforced plastic rod 17 which is effectively in series with the porcelain insulator 19 is electrically resistant and possesses the ability to resist moderate trackage current while providing the rigidity and mechanical strength required to maintain the preselected spacing between the conductors. The glass fiber rod must tolerate some leakage current but is protected from substantial leakage currents that would deteriorate the rod by the presence of the porcelain insulators. In addition, the weight or mass of the insulators being secured to and supported by the conductors at mid-span affords a vibration damping action and restrains gyration of the conductors.

Although but one embodiment has been shown and described it will be apparent to those skilled in the art that various changes and modifications may be made therein without departing from the spirit of the invention or from the scope of the appended claims.

What is claimed is:

1. In combination with three spaced transmission conductors, a mid-span spreader comprising first and second substantially rigid glass fiber rod members, each of said rod members having a pair of glazed porcelain insulators secured about said rod respectively adjacent the ends thereof with said porcelain insulators each having a side wire groove and annularly undercut portions at each axial side of said groove; first tie means securing one of said conductors successively to one of each of said pairs of insulators at the respective side wire grooves thereof; second tie means securing a second of said conductors to the other insulator secured to said first rod member at the side wire groove of said insulator and third tie means securing the third of said conductors to the other insulator secured to said second rod member at the side wire groove of said insulator.

2. In combination with three spaced conductors, a mid-span spreader comprising a pair of substantially rigid high-strength electrically insulating rod members; a first pair of spool-type glazed porcelain insulators secured about one of said rod members respectively adjacent the ends thereof; a second pair of spool-type glazed porcelain insulators secured about the other of said rod members respectively adjacent the ends thereof, each of said spool-type insulators having a side wire groove and annularly undercut portions at each axial side of said groove to provide an extended highly track resistant surface; a single continuous first tie member securing one of said conductors successively to one of said first pair of spool-type insulators and one of said second pair of spool-type insulators respectively at the side wire grooves thereof; and second and third tie members each securing one of the other two of said conductors respectively to one of the other spool-type insulators of each of said first and second pairs at the respective side wire grooves thereof.

References Cited by the Examiner

UNITED STATES PATENTS

| 280,947 | 7/83 | Ohl | 174—146 |
| 308,818 | 12/84 | Arnold | 174—146 |
| 2,276,559 | 3/42 | Bashore | 174—146 X |
| 2,937,727 | 5/60 | Kaczmarek | 174—161 X |
| 2,961,479 | 11/60 | Bertling | 174—146 X |

FOREIGN PATENTS 171,900  12/21  Great Britain.

JOHN F. BURNS, *Primary Examiner.*

JOHN P. WILDMAN, *Examiner.*